United States Patent
Koshinaka

(10) Patent No.: US 6,671,417 B1
(45) Date of Patent: Dec. 30, 2003

(54) CHARACTER RECOGNITION SYSTEM

(75) Inventor: Takafumi Koshinaka, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 09/574,013

(22) Filed: May 19, 2000

(30) Foreign Application Priority Data

May 19, 1999  (JP) .......................................... 11/137944

(51) Int. Cl.$^7$ .............................. G06K 9/40; G06K 9/36
(52) U.S. Cl. ...................... 382/254; 382/289; 382/290; 382/291; 382/292
(58) Field of Search ................................ 382/289, 290, 382/291, 292, 293, 294, 295, 296, 321, 286, 200, 199, 276, 254, 275, 202, 125, 232, 191

(56) References Cited

U.S. PATENT DOCUMENTS

| 5,638,466 A | * | 6/1997 | Rokusek ..................... 382/290 |
| 5,647,024 A | * | 7/1997 | Kawauchi et al. .......... 382/232 |
| 5,940,544 A | * | 8/1999 | Nako ......................... 382/293 |
| 6,314,197 B1 | * | 11/2001 | Jain et al. ................... 382/125 |
| 6,424,745 B1 | * | 7/2002 | Hansen et al. .............. 382/191 |

FOREIGN PATENT DOCUMENTS

JP          7-306915 A      11/1995

OTHER PUBLICATIONS

Madhvanath, S. and Govindaraju, V., Contour–based image preprocessing for holistic handwritten word recognition, I.E.E.E., pp.: 536–539 vol. 2, Aug. 18–20, 1997.*

R.M. Bozinovic et al., "Off–Line Cursive Script Word Recognition", IEEE Transactions on Pattern Analysis and Machine Intelligence, vol. 11, No. 1, Jan. 1989, pp. 68–83 with Abstract.

T. Caesar et al., "Estimating the Baseline for Written Material", Proceeding of Third International Conference on Document Analysis and Recognition, 1995, pp. 382–385 with Abstract.

* cited by examiner

*Primary Examiner*—Samir Ahmed
*Assistant Examiner*—Brian Le
(74) *Attorney, Agent, or Firm*—Sughrue Mion, PLLC

(57) ABSTRACT

A reference line detecting step 4 assumes two reference lines dividing a character row image into three, i.e., upper, intermediate and lower areas to be quadratic curves independent of one another, and obtains parameters determining the two reference lines such as to best separate the length distributions of white runs in the three areas from one another. A reference line correcting step 5 corrects the character row image from the parameters and the same image such as to obtain two horizontal reference lines and predetermined values of area (i.e., height) ratios of the three areas, and feeds the corrected image back to a preprocessing step 2. A character row reading step 3 executes character segmentation, feature extraction and character recognition with the character row image from the preprocessing means 2. The means 3 executes selection of the character recognition results, and outputs a most likely read-out result.

38 Claims, 4 Drawing Sheets

S A
S B
S D good

Wilixington

CHARACTER RECOGNITION SYSTEM

BACKGROUND OF THE INVENTION

The present invention relates to character recognizing systems, character recognizing methods and recording media, in which control programs for the same are recorded, and more particularly to optical character recognizing systems for reading characters written on paper or the like with an optical sensor.

In prior art character recognizing systems of the pertaining type, some preprocessings are executed on inputted image for the purpose of correcting variations of the size, skew, etc. of the inputted image.

Among well-known examples of preprocessing are character size normalization and skew correction. Among these preprocessings, reference line detection and correction are particularly applied to character strings of English words or like alphabet characters.

FIG. 5 is a view illustrating the definition of reference lines of a character row. The reference lines are of two different kinds, i.e., an upper and a lower reference line. The dashed and broken lines shown in superposition on the word "good" in FIG. 5 are the lower and upper reference lines, respectively. The position of the upper reference line is determined such that the upper, end of lowercase characters without ascender or descender (such as a, c, e, m, n, o, u, v, w, x and z) is found on or in the vicinity of the line. The position of the lower reference line is determined such that the lower end of lowercase characters without ascender or descender is found on or in the vicinity of the line.

Considering rectangular areas inscribing and circumscribing a character row, the area under the lower reference line is referred to as descender area. The area over the upper reference line is referred to as ascender area. And the area intervening between the upper and lower reference lines is referred to as body area.

One purpose of reference line detection and correction is as follows; Usually, the area ratios of the body, descender and ascender areas of a hand-written character row are not fixed. The descender and ascender sizes depend on writers. In other words, the area ratios of the body, descender and ascender areas vary with writers. Therefore, only with size normalization for entire character string image, the body area size variations remain, so that it is difficult to read a character row with high accuracy in the succeeding character recognizing process stage.

By detecting the reference lines and correcting the image to obtain constant area ratios (or height ratios) of the body, descender and ascender areas (for instance 1:1), normalized body, descender and ascender areas are obtainable, so that it is possible to expect an accurate character recognizing process in the succeeding stage.

The reference line detection and correction have the following second purpose. Usually, characters in a character row are rarely written in an accurate horizontal direction. In many cases, as a hand-written character row proceeds rightward, the character position is deviated vertically, and also the character size is increased and decreased. Consequently, the upper and lower reference lines fail to be horizontal and parallel. (FIG. 6 shows such an example.)

By detecting the reference lines from the inputted character row image and correcting the image to obtain horizontal reference line skew, variations of the character row skew and character size in the row can be observed, so that it is possible to expect accurate character recognition in the succeeding stage.

For the above purposes, the prior art character recognizing system has a character row reference line detecting and correcting means. The prior art described above is disclosed in Bozinovic et al, "Off-Line Cursive Script Word Recognition", IEEE Transactions on Pattern Analysis and Machine Intelligence, Vol. 11, No. 1, pp. 68–83, 1989.

In a reference line detecting process disclosed in this literature, a histogram of a horizontally written character row image is obtained by projecting the image horizontally and counting black pixels in each row. Then, the differences between the black pixel numbers in adjacent pixel columns are calculated, positions corresponding to the maximum and minimum differences are then selected, and horizontal straight lines containing the selected positions are made to be the reference lines. This method utilizes the fact that many black pixels are present in the body part of the image.

Another method is disclosed in Caesar et al, "Estimating the Baseline for Written Material", Proceeding of Third International Conference on Document Analysis and Recognition, 1995.

In a reference line detection process disclosed in this literature, the contour lines of a horizontally hand-written character row image are vertically divided into two parts, and the locally maximal points of the upper contour parts and the locally minimal points of the lower contour parts are all extracted. Then, by adopting the least square method, straight lines are applied as the upper and lower reference lines to the maximal points of the upper contour parts and the minimal points of the lower contour parts. This method utilizes the fact that the majority of the contour lines are located in the neighborhood of the reference lines.

As described above, the prior art techniques mostly utilize such geometric data as image projection and contour directions to detect reference lines by outputting straight lines, which are best applicable as the upper and lower reference lines.

In the above prior art character recognizing method, only positions (y-coordinates) of the upper and lower reference lines, or only positions (y-coordinates) and skews of the reference lines, are estimated under the assumption that the reference lines are straight lines which are horizontal or have a given skew.

FIG. 7 is a block diagram showing the functional constitution of a prior art example of character recognizing system. This example of character recognizing system comprises an image recording means 1, a preprocessing means 2, a character row reading means 3, a reference line detecting means 6 and a reference line correcting means 5. The reference line detecting means 6 includes a reference line position estimating means 41 and a reference line skew estimating means 42.

The image recording means 1 stores an inputted character row image. The preprocessing means 2 executes a preprocessing, such as size normalization or character skew correction of the character row image reproduced from the image recording means 1. The character row reading means 3 reads out character rows in the image preprocessed in the preprocessing means 2 by adequately executing character segmentation, character recognition, language processing, etc.

The reference line detecting means 6 receives the character row image as the subject of preprocessing from the preprocessing means 2, and estimates the positions and skews of reference lines of the character rows. In the reference line detecting means 6, the reference line position estimating means 41 estimates reference line positions (y-coordinates), and the reference line skew estimating means 42 estimates reference line skews.

The reference line correcting means 5 receives the estimated values of the reference line positions and skews from the reference line detecting means 6, and shapes the character row image by affine transformation to obtain horizontal reference lines and predetermined area ratios of the body, descender and ascender areas.

The reference line detecting means 6 projects the character row image horizontally, and produces a histogram by calculating the black pixel number for each pixel row. Specifically, the means 6 obtains the total black pixel number $h(j)$ ($j=1, \ldots, N$) of pixel row corresponding to y-coordinate j (i.e., vertical coordinate, being positive in downward direction of the image. N is the height of the character row image.

The reference line position estimating means 41 calculates histogram difference $(h(j)-h(j-1))$, ($j=1, \ldots, N-1$) between adjacent coordinates, and stores the value of j corresponding to the maximum difference as the position of upper reference line. The means 41 also stores the value of j corresponding to the minimum difference as the position of lower reference line.

The reference line skew estimating means 42 projects the character row image not only horizontally but also in some other directions such as rightwardly upward and rightwardly downward directions, and produces histograms each for each direction. Denoting the projection histogram deviating by θ indirection from the horizontal direction by h (j, θ, the means 42 stores the value of θ corresponding to the maximum value of histogram difference $h(j, θ)-h(j-1, θ)$ as the skew of upper reference line. The means 42 also stores the value of θ corresponding to the minimum value of histogram difference $h(j, θ)-h(j-1, θ)$ as the skew of lower reference line.

The reference line correcting means 5 receives the results of the reference line detection, i.e., the upper and lower reference line position and skew data, and shapes the image to obtain horizontal upper and lower reference lines and predetermined area ratios (for instance 1:1:1) of the body, descender and ascender areas. The means feeds the shaped image data back to the preprocessing means 2.

The preprocessing means 2, receiving the reference line corrected image, executes if necessary, other preprocessings, and feeds the resultant shaped image data to the character row reading means 3. The character row reading means 3 reads out character rows from the received character row image by executing character segmentation, feature extraction, character recognition, language processing, etc., and outputs the result.

However, the positions and sizes of characters constituting hand-written character rows are not always regular. In other words, characters are not always written with their positions set on a straight line from the first to the last one of them, and some characters may be written in curved rows irrespective of the writer's will. Also, characters in a character row may fluctuate in size. Consequently, it is often inadequate to estimate only the position and skews of the reference lines of a character row by assuming that the reference lines are straight.

FIG. 6 shows an example of character row image, to which it is difficult to apply straight lines as the reference lines. In the illustrated character row image ("Wilmington"), slightly rightwardly upward reference lines are seemingly applicable to the first half part of the character row. However, for the second half part of the row it is adequate to apply substantially horizontal reference lines. When such image is inputted, it is difficult with the prior art reference line detection and correction to obtain adequate image shaping. Such non-linear character position and size variation components in a character row will be hereinafter referred to as "undulations".

When adequate shaping is not obtained as a result of the reference line detection and correction in the preprocessing stage, variations concerning the reference line variations remain without being absorbed in the succeeding stage character reading means. In such a case, stable features of image cannot be extracted by a feature extracting process, which is executed under the assumption that adequate reference line correction has been executed, thus giving rise to erroneous recognition in the character recognition. Therefore, it is necessary in the character row reference line detection and estimation in the preprocessing stage to estimate reference lines accurately and at a practical processing rate by applying curved lines to the reference lines instead of limiting the reference lines to straight lines.

Hitherto, a reference line detecting means in which curved lines are applied, has not been realized. In the second prior art example described before, the reference lines are determined by extracting locally maximal and locally minimal points of contours and applying straight lines to these points using the least square method. It is possible in a formula point of view to use curved lines instead of straight lines for calculating curved reference lines in the least square method. However, the locally maximal and locally minimal points of contours are unstable in position and not present in a large number. Therefore, it is practically impossible to utilize this method for accurately applying curved lines, although the method may be utilized for applying straight lines.

SUMMARY OF THE INVENTION

An object of the present invention, accordingly, is to solve the above problems by the provision of a character recognizing system, which is robust and operable at a practical processing rate with respect to the recognition of character row images with non-linear undulations in the position and size of character rows, as well as a character recognizing method for the same and a recording medium, in which a control program for the same is recorded.

According to an aspect of the present invention, there is provided a character recognizing system comprising image storing means for storing an inputted character row image, a preprocessing means for shaping the character row image stored in the image storing means by correcting deformations of the character row image in size, skew, etc., a reference line detecting means for detecting two, i.e., upper and lower, reference lines characterizing the positions of the characters in a character row in the character row image received from the preprocessing means, a reference line correcting means for shaping the character row image such as to correct the upper and lower reference lines on the basis of the reference line detection result from the reference line detecting means and the character row image, and outputting the shaped character row image back to the preprocessing means, and a character row reading means for reading a character row from the character row image having been shaped in the reference line correcting means and received from the preprocessing means, the reference line detecting means including a reference line position estimating means for obtaining the positions of the reference lines, a reference line skew estimating means for obtaining the skews of the reference lines from the horizontal direction, and a reference line curvature radius estimating means for obtaining the radii of curvature of the reference lines.

According to another aspect of the present invention, there is provided a character recognizing method comprising image storing step for storing an inputted character row image, a preprocessing step for shaping the character row image stored in the image storing step by correcting deformations of the character row image in size, skew, etc., a reference line detecting step for detecting two, i.e., upper and lower, reference lines characterizing the positions of the characters in a character row in the character row image received from the preprocessing step, a reference line correcting step for shaping the character row image such as to correct the upper and lower reference lines on the basis of the reference line detection result from the reference line detecting step and the character row image, and outputting the shaped character row image back to the preprocessing step, and a character row reading step for reading a character row from the character row image having been shaped in the reference line correcting step and received from the preprocessing step, the reference line detecting step including a reference line position estimating step for obtaining the positions of the reference lines, a reference line skew estimating step for obtaining the skews of the reference lines from the horizontal direction, and a reference line curvature radius estimating step for obtaining the radii of curvature of the reference lines.

According to other aspect of the present invention, there is provided a character recognizing method comprising steps of: first shaping step for shaping an input character row image by correcting deformations of the character row image in size and skew; detecting step for detecting upper and lower reference lines characterizing positions of the characters in a character row in the character row image; second shaping step for shaping the character row such as to correct the upper and lower reference lines on the basis of the reference line detection result; reference line detecting step for obtaining the positions of the reference lines; reference line skew estimating step for obtaining the skews of the reference lines from the horizontal direction; and reference line curvature radius estimating step for obtaining the radii of curvature of the reference lines.

According to still other aspect of the present invention, there is provided a recording medium with a character recognition control program recorded the rein for causing a character recognizing system to execute character recognition by causing a reference line detecting step to obtain position of reference lines, obtain skews of the reference lines from the horizontal direction and obtain radii of curvature of the reference lines.

In summary, in the character recognizing system according to the present invention, the reference line detecting means for detecting the reference lines of a character row includes the means for estimating the radii of curvature of the reference lines in addition to the reference line position and skew estimating means.

For estimating the positions, skews and radii of curvature with less processing effort, the character recognizing system according to the present invention uses horizontal white runs of image. More specifically, the reference lines are determined such that the variance of white run length is less in each of three character row image areas, which are defined by dividing the character row image with two, i.e., upper and lower, reference lines, and that the average run length is as great as possible in the upper and lower areas and as less as possible in the central area.

Thus, it is possible to realize character row read-out, which is robust with respect to character row deformations of hand-written character rows stemming from irregularities of the character positions and sizes in the character rows, particularly robust with respect to character row deformations with non-linear character position and size variations and producing undulations.

Other objects and features will be clarified from the following description with reference to attached drawings.

PREFERRED EMBODIMENTS OF THE INVENTION

Preferred embodiments of the present invention will now be described with reference to the drawings.

Figure 1:
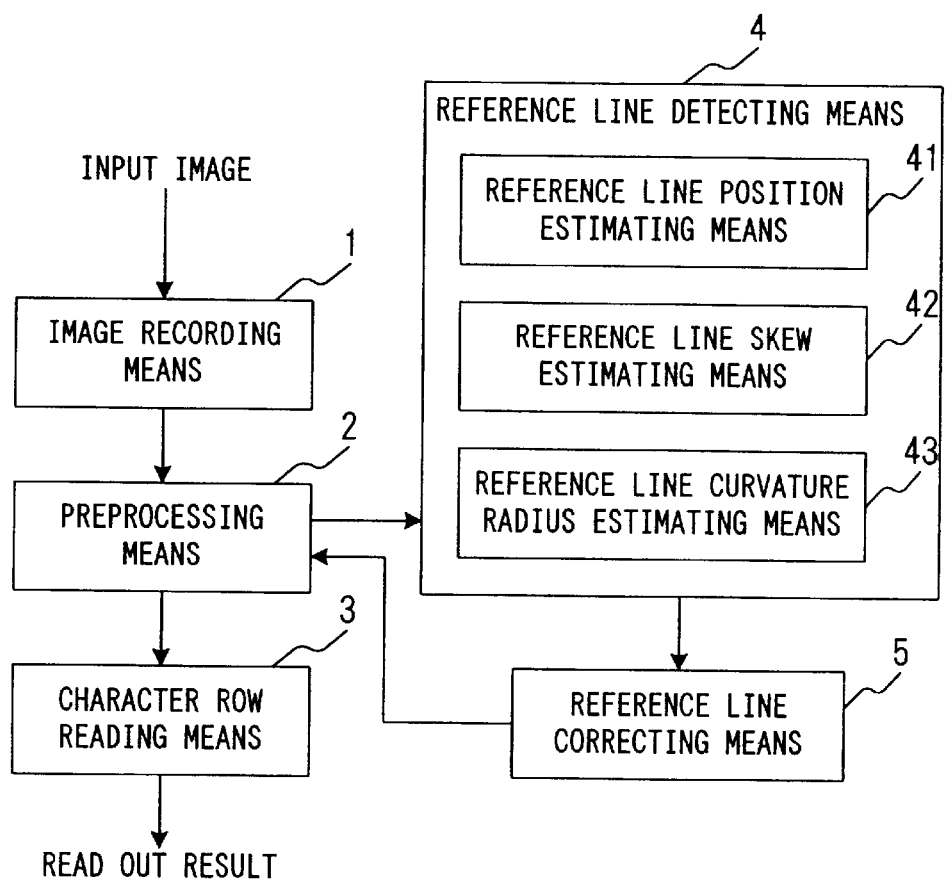
FIG. 1 is a block diagram showing an embodiment of a character recognizing system according to the present invention.

FIG. 1 is a block diagram showing an embodiment of a character recognizing system according to the present invention. This example of character recognizing system comprises an image recording means 1, a preprocessing means 2, a character row reading means 3, a reference line detecting means 4 and a reference line correcting means 5. The reference line detecting means 4 includes a reference line position estimating means 41, a reference line skew estimating means 42 and a reference line curvature radius estimating means 43.

The image storing means 1 stores an inputted character row image. The preprocessing means 2 executes a preprocessing, such as size normalization or character skew correction of the character row image reproduced from the image storing means 1. The character row reading means 3 reads out character rows in the image preprocessed in the preprocessing means 21 by adequately executing character segmentation, character recognition, language processing, etc.

The reference line detecting means 4 receives the character row image as the subject of preprocessing from the preprocessing means 2, and estimates the positions, skews and curvature radii of reference lines of the character rows. In the reference line detecting means 4, the reference line position estimating means 41 estimates reference line positions (y-coordinates), the reference line skew estimating means 42 estimates reference line skews, and the reference line curvature radius estimating means 43 estimates the reference line curvature radius.

The reference line correcting means 5 receives the estimated values of the reference line positions, skews and curvature radii from the reference line detecting means 6, and shapes the character row image by affine transformation to obtain horizontal reference lines and predetermined area ratios of the body, descender and ascender areas. The above individual means can be realized as programs stored for operation in a computer. As for the rectangular areas defined by the reference lines, the area under the lower reference line is referred to as descender area, the area over the upper reference area is referred to as ascender area, and the area defined between the upper and lower reference lines is referred to as body area.

Figure 2:
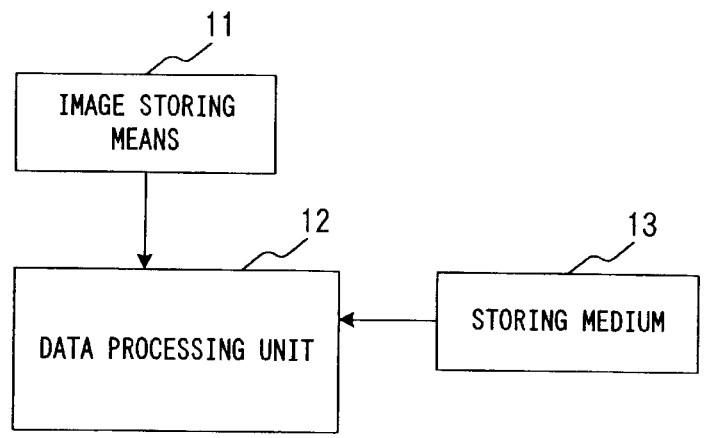
FIG. 2 is a block diagram showing the system construction of the character recognizing system embodying the present invention.

FIG. 2 is a block diagram showing the system construction of the character recognizing system embodying the present invention. Referring to the Figure, the character recognizing system comprises an image storing means 11, a data processing unit 12 and a storing medium 13. The processes in the individual means shown in FIG. 1 are realized with the execution, in the data processing unit 12, of a character recognition control program stored in the recording medium 13. As the recording medium 13 may be used a CD-ROM, a magnetic disc, a semiconductor memory and other recording media. Furthermore, the character recognition control program may be circulated via a network.

The character recognition control program is read out from the storing medium 13 into the data processing unit 12, and controls the operation thereof. The data processing unit 12 operates as follows. The preprocessing means 2 executes size and skew preprocessings on the character row image inputted from the image storing means 11 under control of the character recognition control program. The reference line detecting means 4 detects the reference lines of a character row having a skew or those of a character row which is liable to be curved. The reference line correcting means 5 shapes the character row image such as to obtain horizontal reference lines and predetermined area ratios of the individual areas of the character row image. The character row reading means 3 executes the character recognition by segmenting character image candidates from the character row image and extracting features of the segmented character image candidates, provides character recognition results, and selects and outputs the most likely read-out result as full character row.

The character recognizing process in the embodiment of the character recognizing system according to the present invention will now be described with reference to FIGS. 1 and 2.

A character row image as the subject of read-out is optically inputted by a scanner (not shown) or the like to the image storing means 1, and is stored in the same. The preprocessing means 2 executes appropriate preprocessings, such as a binarization process on the character row image to convert a gray-level image to a binary image capable of being more readily handled, a normalization process of shaping the image in terms of the character size, character stroke interval, character skew, etc., and a noise removal process of removing contaminations and faint and patchy portions in the image, and feeds the resultant character row image to the reference line detecting means 4.

The reference line detecting means 4 detects the upper and lower reference lines of the character row image by obtaining the position, skew and radius of curvature of the reference lines, and feeds the result of detection and the image to the reference line correcting means 5. The reference line correcting means 5 shapes the character row image by coordinates transformation to obtain horizontal upper and lower reference lines and predetermined area ratios of the body, descender and ascender areas, and feeds the shaped character row image back to the preprocessing means 2.

The operations of the reference line detecting and correcting means 4 and 5 will now be described in detail. The preprocesses described above, inclusive of reference line detecting and correcting processes that will be described hereinunder, may be executed in any order. However, it is necessary to input binarized image to the reference line detecting and correcting means 4 and 5.

The character row reading means 3 recognizes characters by cutting out several character image candidates from the character row image by using geometric features of the character row drawing, such as connecting property and contour line depressions, and extracting features useful for the recognition from the individual character image candidates. Specifically, the means 3 compares the character image candidates with character templates (or dictionary) that are preliminarily stored, and selects several candidates of categories, which the character image candidates belong to.

The character row reading means 3 further arranges the character image candidates and selects certain combinations of character image candidates such as to be above to obtain the original character row image. For each of these combinations, the means 3 further calculates the summations of the results of recognition of the individual character image candidates and the likelihoods of the recognition results (for instance, distance between character image candidate and template). The means 3 then selects the combination of the greater recognition result likelihood summation, and outputs the selected combination as the character row read-out result.

Figure 3:
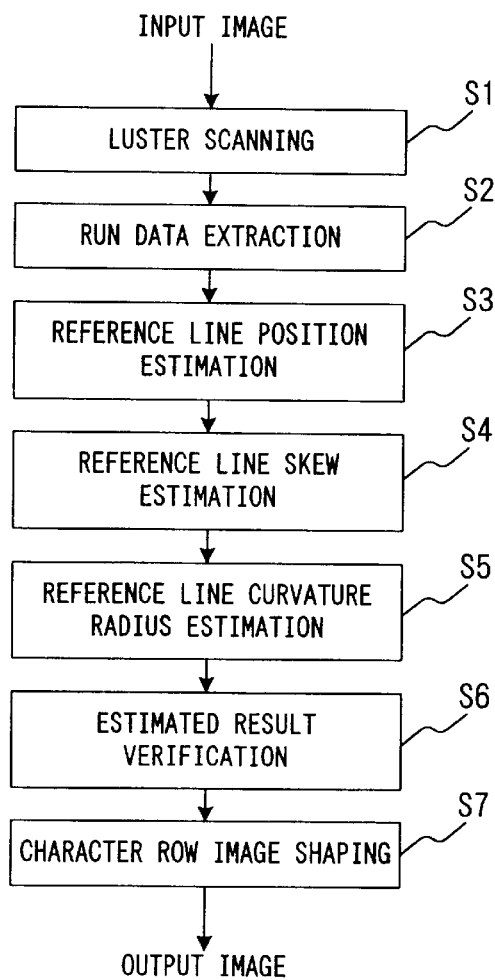
FIG. 3 is a flow chart illustrating the operation of the reference line detecting and correcting means 4 and 5.
Figures 4, 5, 6:
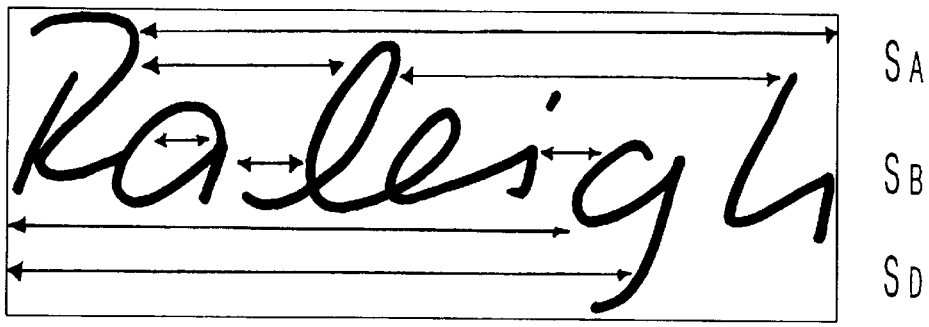
FIG. 4 is a view showing that white run lengths are different with character row image areas.
FIG. 5 is a view illustrating the definition of reference lines of a character row.
FIG. 6 shows an example of character row image, to which it is difficult to apply straight lines as the reference lines.
Figure 7:
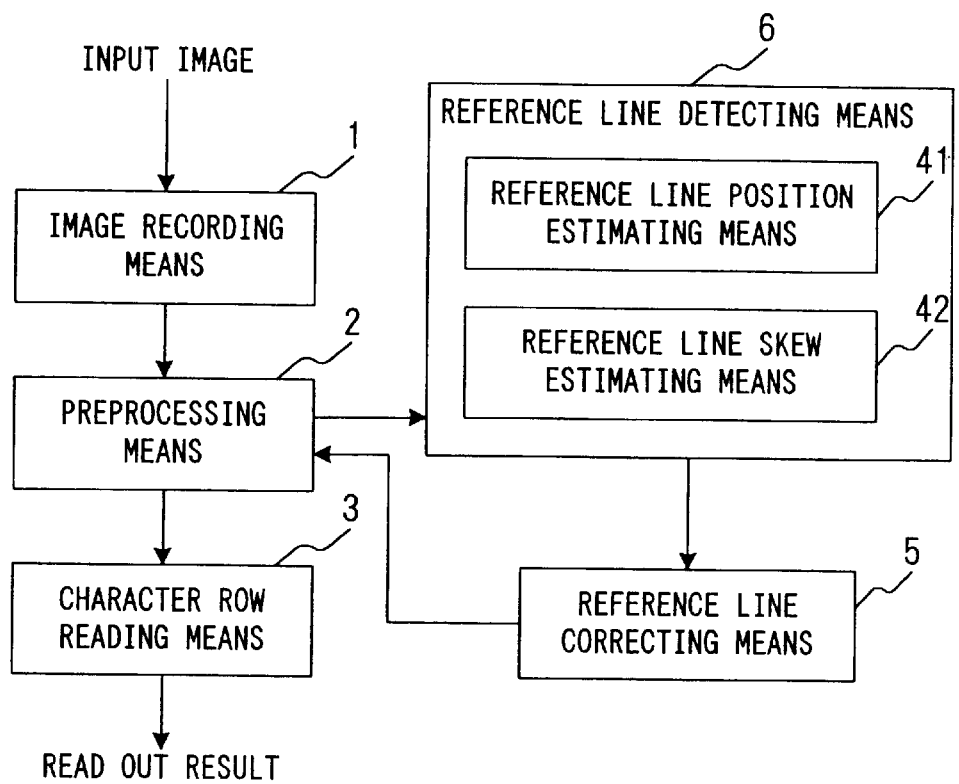
FIG. 7 is a block diagram showing the functional constitution of a prior art example of character recognizing system.

FIG. 3 is a flow chart illustrating the operation of the reference line detecting and correcting means 4 and 5. FIG. 4 is a view showing that white run lengths are different with character row image areas. The operations of the reference line detecting and correcting means 4 and 5 will now be described with reference to FIGS. 1, 3 and 4.

Upon receipt of character row image (i.e., binarized image) from the preprocessing means 2, the reference line detecting means 4 extracts all white runs by horizontal luster scanning (step Si in FIG. 3). The term "white run" means a train of white pixels appearing continuously when the pixel values of pixels in a row (for instance from left to right) are checked. The term "white pixel" means a pixel, which is found in a background part not belonging to the character drawing.

The reference line detecting means 4 stores the length (or run length) and the position of each extracted run. Assuming here that N runs could be extracted from an input image, the position of the j-th run is represented by the coordinates $(X_j, Y_j)$ of the left end pixel of that run. Here, the rightward direction of X-axis is referred to as positive direction thereof, and the downward direction of Y-axis is referred to as positive direction thereof. The run length is represented by the number $L_i$ of the continuous pixels. N run data $(X_j, Y_j, L_j)$ $(j=1, 2, \ldots, N)$ are thus obtained, and these data are stored (step S2). While in this embodiment the left end of a run is defined to be the position thereof, it is also possible to define the right end or the mid point between the left and right ends of a run, as the position thereof.

The reference line detecting means 4 executes reference line detection, i.e., it estimates the values of parameters which absolutely determine the reference lines. Such parameters are the positions, the skews and the radii of curvature of the upper and lower reference lines. Denoting the position, the skew and the radius of curvature of the upper reference line by $a_T$, $b_T$ and $c_T$, respectively, and the position, the skew and the radius of curvature of the lower reference line by $a_B$, $b_B$ and $c_B$, respectively, the upper and lower reference lines are represented by quadratic curves:

$$y = a_T + b_T * X + c_T * X * X$$

and $y = a_B + b_B * X + c_B * X * X$.

Of the character row image, the ascender area (i.e., the area above the upper reference line) is represented by $S_A$, the descender area (i.e., the area under the lower reference line) is represented by $S_D$, and the body area (i.e., the area intervening between the upper and lower reference lines) is represented by $S_B$. Thus, $$S_A = ((X, Y) | Y < a_T + b_T * X + c_T * X * X)$$

$$S_D = ((X, Y) | Y > a_B + b_B * X + c_B * X * X)$$

and $$S_B = (X, Y) | a_T + b_T * X + c_T * X * X < Y < a_B + b_B * X + c_B * X * X)$$

Denoting the numbers of runs belonging to the areas $S_A$, $S_D$ and $S_B$ by $N_A$, $N_D$ and $N_B$, the average run lengths by $E_A$, $E_D$ and $E_B$ and the run length variances by $V_A$, $V_D$ and $V_B$, $$E_A = \frac{1}{N_A} \sum_{(X_i, Y_i) \in S_A} L_i, \quad V_A = \frac{1}{N_A} \sum_{(X_i, Y_i) \in S_A} (L_i - E_A)^2 \quad \text{(Formulas 1)}$$

$$E_D = \frac{1}{N_D} \sum_{(X_i, Y_i) \in S_D} L_i, \quad V_D = \frac{1}{N_D} \sum_{(X_i, Y_i) \in S_D} (L_i - E_D)^2$$

$$E_B = \frac{1}{N_B} \sum_{(X_i, Y_i) \in S_B} L_i, \quad V_B = \frac{1}{N_B} \sum_{(X_i, Y_i) \in S_B} (L_i - E_B)^2$$

Using the equations of the (Formulas 1), an evaluation function J ($a_B$, $b_B$, $c_B$, $a_T$, $b_T$, $c_T$) is given as follows;

$$J(a_B, b_B, c_B, a_T, b_T, c_T) = \frac{(2E_B - E_A - E_D)^2}{V_A + 2V_B + V_D} \quad \text{(Formula 2)}$$

The equation of (Formula 2) represents the ratio between inter-class variance and intra-class variance when the runs in the character row image are classified into the three classes $S_A$, $S_D$ and $S_B$. In an example of character row image shown in FIG. 4, as many small length runs are contained in $S_B$ while many large length runs are contained in $S_A$ and $S_D$, and also the run length variances in the individual classes $S_B$, $S_A$ and $S_D$ are held within narrow ranges (i.e., if the run length variances are small), the evaluation function has a large value.

In other words, by setting the upper and lower reference lines such as to divide the image into large white run length ascender and descender areas and a small white run length body area, the evaluation function has a large value. The reference lines are thus determined by determining $a_B$, $b_B$, $c_B$, $a_T$, $b_T$ and $c_T$ such as to make the evaluation function of (Formula 2) maximum.

The evaluation function may be defined by any other form than the above equation of (Formula 2) as well, so long as it can serve as a measure for the extent of separation of the inter-class distributions. For example, by defining the evaluation function by a simplified form of $J = 2E_B - E_A - E_D$, the calculations of the variances can be dispensed with, and the processing rate can be improved.

The reference line position, skew and curvature radius estimating means 41 to 43 obtain the positions $a_T$ and $a_B$ of the upper and lower reference lines by using the N run data $(X_j, Y_j, L_j)$ (j=1, 2, . . . , N), which are obtained by the luster scanning and the run data extraction (steps S3 to S5 in FIG. 3) in the following procedures.

The reference line position estimating means 41 calculates the value of the evaluation function J ($a_B$, 0, 0, $a_T$, 0, 0) with the skews and the radii of curvature of the reference lines set to "0" in a range of $0 < a_T < a_B < H$. Here, H represents the height of the image. The reference line position estimating means 41 selects $a_T$ and $a_B$ corresponding to the maximum value of the evaluation function, and stores the selected parameters as $a_T^*$ and $a_B^*$.

The reference line skew estimating means 42 calculates the value of the evaluation function J ($a_B^*$, $b_B$, 0, $a_T^*$, $b_T$, 0) with the positions of the upper and lower reference lines set to $a_T^*$ an $a_B^*$ and the radii of curvature of the reference lines set to "0" by moving $b_T$ and $b_B$ in an appropriate range (for instance $-\frac{1}{2}$ to $\frac{1}{2}$ at an interval of 0.1). The means 42 selects $b_T$ an $b_B$ corresponding to the maximum value of the evaluation function, and stores these parameters as $b_T^*$ and $b_B^*$.

The reference line curvature radius estimating means 43 calculates the value of the evaluation function J ($a_B^*$, $b_B^*$, $c_B$, $a_T^*$, $b_T^*$, $c_T$) with the positions of the upper and lower reference lines set to $a_T^*$ and $b_B^*$ and the skews of the reference lines set to $b_T^*$ and $b_B^*$ by moving $c_T$ and $c_B$ in an appropriate range (for instance $-1$ to $1$ at an interval of 0.1). The means 43 selects $c_T$ and $c_B$ corresponding to the maximum value of the evaluation function, and stores these parameters as $c_T^*$ and $c_B^*$.

For verifying the likelihood of the obtained parameter estimation results $a_T^*$, $b_T^*$, $c_T^*$, $a_B^*$, $b_B^*$ and $c_B^*$, the reference line detecting means 4 executes calculations of $$\delta_A = |E_A - E_B|/E_A$$

and $\delta_B = |E_D - E_B|/E_D$.

under the assumptions that $a_T = a_T^*$, $b_T = b_T^*$, $c_T = c_T^*$, $a_B = a_B^*$, $b_B = b_B^*$ and $c_B = c_B^*$.

If $\delta_A$ is sufficiently smaller than unity, the reference line detecting means 4 judges that $S_A$ and $S_B$ represent areas of the same kind, that is, the given character row image does not have any ascender area. In this case, the means 4 discards the parameter estimation results concerning the upper reference line, and sets $a_T = 0$, $b_T = 0$ and $c_T 0$.

Likewise, if $\delta D$ is sufficiently smaller than unity, the reference line detecting means 4 judges that SD and SB represent areas of the same kind, i.e., the given character row image does not have any descender area. In this case, the means 4 discards the parameter estimation results concerning the lower reference line, and sets $a_B = H-1$ (H being the height of the image), $b_B = 0$ and $c_B = 0$ (step S6 in FIG. 3).

The reference line correcting means 5, receiving the parameters $a_B^*$, $b_B^*$, $c_B^*$, $a_T^*$, $b_T^*$ and $c_T^*$ representing the reference lines and the character row image from the reference line detecting means 4, corrects the character row image (step S7 in FIG. 3). The correction is executed as follows.

Now, a pixel with coordinates (X, Y) (X=0, 2, . . . , W−1, Y=0, 2, . . . , H−1, W and H being the width and the height, respectively, of the character row image) in the image before the reference line correction will now be considered. Also, a pixel column (X, 0), (X, 1), . . . , (X, H−1) at coordinate X will be considered.

In this pixel row, the pixels belonging to the ascender area are in a range of $0 \leq Y \leq a_T^* + (b_T^*)^*X + (c_T^*)^*X^*X$, those belonging to the body area are in a range of $a_T^* + (b_T^*)^*X + (c_T^*)^*X^*X \leq Y \leq a_B^* + (b_B^*)^*X + (c_B^*)^*X^*X$, and those belonging to the ascender area are in a range of $a_B^* + (b_B^*)^*X + (c_B^*)^*X^*X \leq Y \leq H-1$.

For making the numbers of pixels belonging to the individual areas to be in fixed ratio such as 1:r:1, the reference line correcting means 5 elongates or contracts the pixel column for each area. Specifically, the means 5 elongates or contracts the pixel column to $H/(2+r)/(a_T^* + (b_T^*)^*X + (c_T^*)^*X^*X)$ for the ascender area, to $rH/(2+r)/(a_B^* + (b_B^*)^*X + (c_B^*)^*X^*X - a_T^* - (b_T^*)^*X - (c_T^*)^*X^*X)$ for the body area, and to $H/(2+r)/(H - a_B^* + (b_B^*)^*X + (c_B^*)^*X^*X)$ for the descender area. The means executes such elongation or contraction for each area for each pixel column located at each X-coordinate.

The specific procedure of the reference line correction will now be described. It is assumed that the pixel values of the character row image before and after the reference line correction are respectively $F(X, Y)$ and $F'(X, Y)$, $(X=0, 1, \ldots, W-1, Y=0, 1, \ldots, H-1)$. With r set to an appropriate constant (about unity), the reference line correcting means 5 calculates the pixel values after the reference line correction as follows.

When $0 \leq Y \leq H/(2+r)$, the calculated pixel values are given as:

$$F'(X, Y) = F(X, (a_T^* + (b_T^*)^*X + (c_T^*)^*X^*X)(2+r)Y/H).$$

When $H/(2+r) \leq Y \leq (1+r)H/(2+r)$, the calculated pixel values are:

$$F'(X, Y) = F(X, (a_T^* + (b_T^*)^*X + (c_T^*)^*X^*X)((1+r)H - (2+r)Y)/rH + (a_B^* + (b_B^*)^*X + (c_B^*)^*X^*X)((2+r)Y - H)/rH).$$

When $(1+r)H/(2+r) < Y < H$, the calculated pixel values are:

$$F'(X, Y) = F(X, (a_B^* + (b_B^*)^*X + (c_B^*)^*X^*X)(2+r)(H-Y)/H + (2+r)Y - (1+r)H).$$

Consequently, in the character row image after the reference line correction the height ratio (or area radios) of the ascender, body and descender areas are 1:r:1 at all X-coordinates, and horizontal straight reference lines (i.e., $b_T^* = c_T^* = b_B^* = c_B^* = 0$) are obtained.

In the above ratios, r is determined in dependence on the feature extracting process in the character row reading means 3. More specifically, when using a feature extracting process of extracting detailed features from the body area, the character row reading means 3 sets r such as to expand the body area. Conversely, when using a feature extracting process of extracting detailed features from the ascender and descender areas, the means 3 sets r to a smaller value. The reference line correcting means 5 feeds the corrected character row image back to the preprocessing means 2. The succeeding stage character row reading means 3 recognizes the character row, and outputs the recognition result.

A different embodiment of the character recognizing system according to the present invention will now be described. This embodiment of the character recognizing system according to the present invention is the same in construction and operation as the preceding embodiment of the character recognizing system shown in FIG. 1 except for that the reference line detecting means 4 executes the reference line detecting process more accurately.

Specifically, the reference line detecting means 4, receiving character row image (i.e., binarized image) from the preprocessing means 2, extracts all runs by horizontal luster scanning. The means 4 then extracts white pixel data from each extracted run, and stores the extracted data. The white pixel data is generated with each white pixel contained in the character row image, and is a set of the run length Li of its own run and its coordinates $(X_i, Y_j)$. Denoting the number of white pixels by N, the pixel data is represented by $(X_j, Y_j, L_j)$ $(j=1, 2, \ldots, N)$.

The reference line detecting means 4 executes reference line detection, i.e., estimation of parameter values which absolutely determine the deference lines. Like the previous embodiment of the present invention, the parameters are $a_T$, $b_T$, $c_T$, $a_B$, $b_B$ and $c_B$, i.e., the positions, skews and radii of curvature of the upper and lower reference lines, and it is assumed that the upper and lower reference lines are expressed by quadratic curves:

$$y = a_T + b_T^*X + c_T^*X^*X$$

and $y = a_B + b_B^*X + c_B^*X^*X$.

Furthermore, the ascender, descender and body areas are represented by $S_A$, $S_D$ and $S_B$, respectively.

In this embodiment, the numbers of white pixels belonging to the areas $S_A$, $S_D$ and $S_B$ are represented by $N_A$, $N_D$ and $N_B$, the run length averages of white pixel data in the individual areas are represented by $E_A$, $E_D$ and $E_B$, and the run length variances in the areas are represented by $V_A$, $V_D$ ands $V_B$. These representations are the same as those in the equation of (Formula 1) noted above except for that the averages and variances concerning white pixels are substituted for those concerning runs. Furthermore, the evaluation function J $(a_B, b_B, c_B, a_T, b_T, c_T)$ is defined as in the equation of (Formula 1) noted above.

The reference line position, skew and curvature radius estimating means 41 to 43 obtain the positions $a_T$ and $a_B$ of the upper and lower reference lines by using N white pixel data $(X_j, Y_j, L_j)$ $(j=1, 2, \ldots, N)$. In the first half of this procedure, like the preceding embodiment of the present invention, the evaluation function is progressively maximized in such order as $(a_T, a_B)$, $(b_T, b_B)$ and $(c_T, c_B)$. The parameter values obtained in this process are stored as $a_T^*$, $a_B^*$, $b_T^*$, $b_B^*$, $c_T^*$ and $c_B^*$, respectively, together with the corresponding evaluation function value data.

Then, the means give small deviations to the parameter values $a_B^*$, $b_B^*$ and $c_B^*$ of the lower reference line, and recalculate evaluation function values as follows. Where $\Delta a$, $\Delta b$ and $\Delta c$ denote small perturbations given to $a_B^*$, $b_B^*$ and $c_B^*$, respectively.

J $(a_B^* \pm \Delta a, b_B^*, c_B^*, a_T^*, b_T^*, c_T^*)$
J $(a_B^*, b_B^* \pm \Delta b, c_B^*, a_T^*, b_T^* c_T^*)$
J $(a_B^*, b_B^*, c_B^* \pm \Delta c, a_T^*, b_T^* c_T^*)$
J $(a_B^*, b_B^* \pm \Delta b, c_B^* \pm \Delta c, a_T^*, b_T^*, c_T^*)$
J $(a_B^* \pm \Delta a, b_B^*, c_B^* \pm \Delta c, a_T^*, b_T^*, c_T^*)$
J $(a_B^* \pm \Delta a, b_B^* \pm \Delta b, c_B^*, a_T^*, b_T^*, c_T^*)$
and J $(a_B^* \pm \Delta a, b_B^* \pm \Delta b, c_B^* \pm \Delta c, a_T^*, b_T^*, c_T^*)$ (Above are 26 recalculated evaluation function values, in total.) The values of $\Delta a$, $\Delta b$ and $\Delta c$ are set to, for instance, 1, 0.1 and 0.1. The evaluation function values inclusive of that at the present time are then compared, and the parameter values corresponding to the maximum function value are stored as new parameter values. For example, when the evaluation function J $(a_B^* + \Delta a, b_B^*, c_B^* - \Delta c, a_T^*, b_T^*, c_T^*)$ has the maximum value, the parameter values are updated such as:

$$a_B^* \leftarrow a_B^* + \Delta a$$

$$b_B^* \leftarrow b_B^*$$

and $c_B^* \leftarrow c_B^* - \Delta c$.

Likewise, values of the evaluation function when the parameter values $a_T^*, b_T^*$ and $c_T^*$ of the upper reference line are slightly perturbed by $\Delta a, \Delta b$ and $\Delta c$ respectively, and for each parameter value set, evaluation function value is recalculated.

$J(a_B^*, b_B^*, c_B^*, a_T^* \pm \Delta a, b_T^*, c_T^*)$ $J(a_B^*, b_B^*, c_B^*, a_T^*, b_T^* \pm \Delta b, c_T^*)$ $J(a_B^*, b_B^*, c_B^*, a_T^*, b_T^*, c_T^* \pm \Delta c)$ $J(a_B^*, b_B^*, c_B^*, a_T^*, b_T^* \pm \Delta b, c_T^* \pm \Delta c)$ $J(a_B^*, b_B^*, c_B^*, a_T^* \pm \Delta a, b_T^*, c_T^* \pm \Delta c)$ $J(a_B^*, b_B^*, c_B^*, a_T^* \pm \Delta a, b_T^* \pm \Delta b, c_T^*)$ and $J(a_B^*, b_B^*, c_B^*, a_T^* \pm \Delta a, b_T^* \pm \Delta b, c_T^* \pm \Delta c)$ (Above are 26 recalculated evaluation function values, in total.)

The evaluation function values inclusive of that at the present time are then compared, and the parameter values corresponding to the maximum function value are stored as new parameter values. For example, when the evaluation function $J(a_B^*, b_B^*, c_B^*, a_T^* + \Delta a, b_T^*, c_T^* - \Delta c)$ has the maximum value, the parameter values are updated such as:

$a_T^* \leftarrow a_T^* + \Delta a$ $b_T^* \leftarrow b_T^*$ and $c_T^* \leftarrow c_T^* - \Delta c$.

The above processes of updating the upper and lower reference lines are alternately and iteratively executed for a certain number of times. When no further parameter updating is done, an end is brought to the iterative parameter updating process.

For verifying the likelihood of the obtained parameter values $a_T^*, b_T^*, c_T^*, a_B^*, b_B^*$ and $c_B^*$, the reference line detecting means 4 calculates $\delta_A = |E_A - E_B|/E_A$ and $\delta_D = |E_D - E_B|/E_D$.

under the assumptions that $a_T = a_T^*, b_T = b_T^*, c_T = c_T^*, a_B = a_B^*, b_B = b_B^*$ and $c_B = c_B^*$.

If $\delta A$ is sufficiently smaller than unity, the reference line detecting means 4 judges that $S_A$ and $S_B$ represent areas of the same kind, that is, the given character row image does not have any ascender area. In this case, the means 4 discards the parameter estimation results concerning the upper reference line, and sets $a_T = 0$, $b_T = 0$ and $c_T = 0$.

Likewise, if $\delta_D$ is sufficiently smaller than unity, the reference line detecting means 4 judges that $S_D$ and $S_B$ represent areas of the same kind, i.e., the given character row image does not have any descender area. In this case, the means 4 discards the parameter estimation results concerning the lower reference line, and sets $a_B = H-1$ (H being the height of the image), $b_B = 0$ and $c_B = 0$.

The reference line correcting means 5, receiving the parameters $a_B^*, b_B^*, c_B^*, a_T^*, b_T^*$ and $c_T^*$ representing the reference lines and the character row image from the reference line detecting means 4, corrects the character row image in the same manner as in the previous embodiment of the present invention.

The reference line correcting means 5 feeds the corrected character row image back to the preprocessing means 2. The subsequent stage character row reading means 3 recognizes the character row, and outputs the recognition result.

As shown above, by assuming quadratic curves instead of straight lines as reference line models in the reference line detection and correction, which is one of the important preprocessings in the read-out of a character row of alphabet characters, it is possible to obtain reference lines which are fitted to non-linear undulations of the positions of characters in hand-written character rows. Consequently, deformations of a character row image can be well absorbed in the preprocessing stage, and character rows can be accurately read out.

In addition, by using white runs which are found in a large number in the character row image as data used for the reference line detection, it is possible to obtain robust estimation of the reference lines in a statistical process. Besides, high rate reference line detection can be realized by using only the simple features of the position and length as white run data and also classifying the parameters determining the reference lines and successively obtaining parameter values in each group.

It is thus possible to realize character row read-out, which is robust with respect to character low deformations due to position and size irregularities of characters, particularly robust with respect to such character position and size deformations as having non-linear undulations.

As has been described in the foregoing, in the character recognizing system according to the present invention, which comprises an image storing means for storing an inputted character row image, a preprocessing means for shaping the character row image stored in the image storing means by correcting deformations of the character row image in size, skew, etc., a reference line detecting means for detecting two, i.e., upper and lower, reference lines characterizing the positions of the characters in a character row in the character row image received from the preprocessing means, a reference line correcting means for shaping the character row image such as to correct the upper and lower reference lines on the basis of the reference line detection result from the reference line detecting means and the character row image, and outputting the shaped character row image back to the preprocessing means, and a character row reading means for reading a character row from the character row image having been shaped in the reference line correcting means and received from the preprocessing means, the reference line detecting means obtains the positions of the reference lines, obtains the skews of the reference lines from the horizontal direction, and obtains the radii of curvature of the reference lines. Thus, the system is robust and operable at a practical processing rate for the recognition of character row images having non-linear undulations in the positions and sizes of characters in character rows.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. A character recognition system comprising:
   an image storing means for storing an inputted character string image;
   a preprocess means for shaping the character string image stored in the image storing means by correcting deformations of the character string image in at least one of size or skew;
   a reference line detecting means for detecting upper and lower reference lines characterizing the positions of the characters in a character string in the character string image received from the preprocessing means;

a reference line correcting means for shaping the character string image to correct the upper and lower reference lines on the basis of the reference line detection result from the reference line detecting means and the character string image, and outputting the shaped character string image back to the preprocessing means; and a character string reading means for reading a character string from the character string image having been shaped in the reference line correcting means and received from the processing means, the reference line detecting means including a reference line position estimating means for obtaining the position of the reference lines, a reference line skew estimating means for obtaining the skew of the reference lines from the horizontal direction, and a reference line curvature radius estimating means for obtaining the radii of curvature of the reference lines.

2. The character recognition system according to claim 1, wherein when the reference line position estimating means detects the reference lines from the character string image, it obtains the reference lines as quadratic curves, which are determined by the positions, the skews and the radii of curvature of the reference lines obtained by the reference line position, skew and curvature radius estimating means, respectively.

3. The character recognition system according to claim 1, wherein when the reference line detecting means detects the reference lines from the character string image, it uses lengths and coordinates of horizontal white runs which are defined as continuous white pixels in rows constituting the background of the character string image.

4. The character recognition system according to claim 3, wherein when the reference line detecting means detects the reference lines from the character string image, it calculates the average lengths of horizontal white runs in individual areas of the character string image defined by lines, and determines the upper and lower reference lines such as to maximize the difference between the average length of horizontal white runs in the area over the upper reference line and the average length of horizontal white runs in the area intervening between the upper and lower reference lines and also the difference between the average length of horizontal white runs in the area under the lower reference line and the average length of horizontal white runs in the area intervening between the upper and lower reference lines.

5. The character recognition system according to claim 4, wherein when the reference line detecting means detects the reference lines from the character string image, it determines the upper and lower reference lines such as to maximize the summation of the difference between the average length of horizontal white runs in the area over the upper reference line and the average length of horizontal white runs in the area intervening between the upper and lower reference lines and the difference between the average length of horizontal white runs in the area under the lower reference line and the average length of horizontal white runs in the area intervening between the upper and lower reference lines.

6. The character recognition system according to claim 3, wherein when the reference line detecting means detects the reference lines from the character string image, it calculates the averages and variances of the lengths of horizontal white runs in the areas of the character string image defined by the upper and lower reference lines, and determines the upper and lower reference lines such as to maximize the ratio of the difference between the average length of horizontal white runs in the area over the upper reference line and the average length of horizontal white runs in the area intervening between the upper and lower reference line and the difference between the average length of horizontal white runs in the area under the lower reference line and the average length of horizontal white runs in the area intervening between the upper and lower reference lines to the total variances in the individual areas.

7. The character recognition system according to claim 6, wherein when the reference line detecting means detects the reference lines from the character string image, it determines the upper and lower reference lines such as to maximize an evaluation function, which has, as its numerator, the summation of the difference between the. average length of horizontal white runs in the area over the upper reference line and the average length of horizontal white runs in the area intervening between the upper and lower reference lines and the difference between the average length of horizontal white runs in the area under the lower reference line and the average length of horizontal white runs in the area intervening between the upper and lower reference lines, and, as its denominator, the summation of the length variance of horizontal white runs in the area over the upper reference line and twice of the length variance of horizontal white runs in the areas intervening between the upper and lower reference lines and the length variance of horizontal white runs in the area under the lower reference line.

8. The character recognition system according to claim 2, wherein when the reference line detecting means estimates positions, skews and curvatures of the upper and lower reference lines, it estimates positions of the upper and lower reference lines, and estimates skews of the upper and lower reference lines on the basis of the estimated positions, and estimates curvature radii of the upper and lower reference lines on the basis of the estimated skews.

9. The character recognition system according to claim 1, wherein when the reference line detecting means detects the reference lines from the character string image, it executes compression and expansion on each vertical pixel column in the image and on each segment devided by the upper and lower reference lines, and shaping such that the upper and lower reference lines are in horizontally parallel and the interval between upper and lower reference lines is constant.

10. A character recognition method comprising:

image storing step for storing an inputted character string image a preprocessing step for shaping the character string image stored in the image storing step by correcting deformations of the character string image in at least one of size or skew, a reference line detecting step for detecting two upper and lower reference lines characterizing the portions of the characters in a character string in the character string image received from the preprocessing step;

a reference line correcting step for shaping the character string image to correct the upper and lower reference lines on the basis of the reference line detection result from the reference line detecting step and the character string image, and outputting the shaped character string image back to the preprocessing step, and a character string reading step for reading a character string from the character string image having been shaped in the reference line correcting step and received from the preprocessing step, the reference line detecting step including;

a reference line position estimating step for obtaining the position of the reference lines;

a reference line skew estimating step for obtaining the skews of the reference lines from the horizontal direction; and a reference line curvature radius estimating step for obtaining the radii of curvature of the reference lines.

11. The character recognition method according to claim 10, wherein when the reference line position estimating step detects the reference lines from the character string image, it obtains the reference lines as quadratic curves, which are determined by the positions, the skews and the radii of curvature of the reference lines obtained by the reference line position, skew and curvature radius estimating step, respectively.

12. The character recognition method according to claim 10, wherein when the reference line detecting step detects the reference lines from the character string image, it uses lengths and coordinates of horizontal white runs constituting the background of the character string image.

13. The character recognition method according to claim 12, wherein when the reference line detecting step detects the reference lines from the character string image, it calculates the average lengths of horizontal white runs in individual areas of the character string image defined by the upper and lower reference lines, and determines the upper and lower reference lines such as to maximize the difference between the average length of horizontal white runs in the area over the upper reference line and the average length of horizontal white runs in the area intervening between the upper and lower reference lines and also the difference between the average length of horizontal white runs in the area under the lower reference line and the average length of horizontal white runs in the area intervening between the upper and lower reference lines.

14. The character recognition method according to claim 13, wherein when the reference line detecting step detects the reference lines from the character string image, it determines the upper and lower reference lines such as to maximize the summation of the difference between the average length of horizontal white runs in the area over the upper reference line and the average length of horizontal white runs in the area intervening between the upper and lower reference lines and the difference between the average length of horizontal white runs in the area under the lower reference line and the average length of horizontal white runs in the area intervening between the upper and lower reference lines.

15. The character recognition method according to claim 12, wherein when the reference line detecting step detects the reference lines from the character string image, it calculates the averages and variances of the lengths of horizontal white runs in the areas of the character string image defined by the upper and lower reference lines, and determines the upper and lower reference lines such as to maximize the ratio of the difference between the average length of horizontal white runs in the area over the upper reference line and the average length of horizontal white runs in the area intervening between the upper and lower reference line and the difference between the average length of horizontal white runs in the area under the lower reference line and the average length of horizontal white runs in the area intervening between the upper and lower reference lines to the total variances in the individual areas.

16. The character recognition method according to claim 15, wherein when the reference line detecting step detects the reference lines from the character string image, it determines the upper and lower reference lines such as to maximize an evaluation function, which has, as its numerator, the summation of the difference between the average length of horizontal white runs in the area over the upper reference line and the average length of horizontal white runs in the area intervening between the upper and lower reference lines and the difference between the average length of horizontal white runs in the area under the lower reference line and the average length of horizontal white runs in the area intervening between the upper and lower reference lines and, as its denominator, the summation of the length variance of horizontal white runs in the area over the upper reference line and twice of the length variance of horizontal white runs in the areas intervening between the upper and lower reference lines and the length variance of horizontal white runs in the area under the lower reference line.

17. The character recognition system according to claim 11, wherein when the reference line detecting step estimates positions, skews and curvatures of the upper and lower reference lines, it estimates positions of the upper and lower reference lines, and estimates skews of the upper and lower reference lines on the basis of the estimated positions, and estimates curvature radii of the upper and lower reference lines on the basis of the estimated skews.

18. The character recognition system according to claim 10, wherein when the reference line detecting step detects the reference lines from the character string image, it executes compression and expansion on each vertical pixel column in the image and on each segment devided by the upper and lower reference lines, and shaping such that the upper and lower reference lines are in horizontally parallel and the interval between upper and lower reference lines is constant.

19. A character recognition method comprising steps of:

first shaping step for shaping an input character string image by correcting deformations of the character string image in size and skew;

detecting step for detecting upper and lower reference lines characterizing positions of the characters in a character string in the character string image;

second shaping step for shaping the character string such as to correct the upper and lower reference lines on the basis of the reference line detection result reference line detecting step for obtaining the positions of the reference lines;

reference line skew estimating, step for obtaining the skews of the reference lines from the horizontal direction; and reference line curvature radius estimating step for obtaining the radii of curvature of the reference lines.

20. A recording medium with a character recognition control program recorded therein for causing a character recognition system to execute character recognition by causing a reference line detecting step to obtain position of reference lines, obtain skews of the reference lines from the horizontal direction and obtain radii of curvature of the reference lines.

21. A character recognition system comprising:

an image storing mechanism configured to store an inputted character string image;

a preprocessing unit configured to shape the character string image stored in the image storing mechanism by correcting deformations of the character string image in size or skew;

a reference line detecting unit configured to detect upper and lower reference lines characterizing the positions of the characters in a character string in the character string image received from the preprocessing unit;

a reference line correcting unit configured to shape the character string image so as to correct the upper and lower reference lines on the basis of the reference line detection result from the reference line detecting unit and the character string image, and outputting the shaped character string image back to the preprocessing unit, and a character string reading unit configured to read a character string from the character string image having been shaped in the reference line correcting unit and received from the preprocessing unit, the reference line detecting unit further including:
- a reference line position estimating unit configured to obtain the positions of the reference lines;
- a reference line skew estimating unit configured to obtain the skews of the reference lines from the horizontal direction; and
- a reference line curvature radius estimating unit configured to obtain the radii of curvature of the reference lines.

22. The character recognition system according to claim 21, wherein when the reference line position estimating unit detects the reference lines from the character string image, it obtains the reference lines as quadratic curves, which are determined by the positions, the skews and the radii of curvature of the reference lines obtained by the reference line position, skew and curvature radius estimating units, respectively.

23. The character recognition system according to claim 21, wherein when the reference line detecting unit detects the reference lines from the character string image, it uses lengths and coordinates of horizontal white runs, which are defined as continuous white pixels in rows constituting the background of the character string image.

24. The character recognition system according to claim 23, wherein when the reference line detecting unit detects the reference lines from the character string image, it calculates the average lengths of horizontal white runs in individual areas of the character string image defined by the upper and lower reference lines, and determines the upper and lower reference lines such as to maximize the difference between the average length of horizontal white runs in the area over the upper reference line and the average length of horizontal white runs in the area intervening between the upper and lower reference lines and also the difference between the average length of horizontal white runs in the area under the lower reference line and the average length of horizontal white runs in the area intervening between the upper and lower reference lines.

25. The character recognition system according to claim 24, wherein when the reference line detecting unit detects the reference lines from the character string image, it determines the upper and lower reference lines such as to maximize the summation of the difference between the average length of horizontal white runs in the area over the upper reference line and the average length of horizontal white runs in the area intervening between the upper and lower reference lines and the difference between the average length of horizontal white runs in the area under the lower reference line and the average length of horizontal white runs in the area intervening between the upper and lower reference lines.

26. The character recognition system according to claim 23, wherein when the reference line detecting unit detects the reference lines from the character string image, it calculates the averages and variances of the lengths of horizontal white runs in the areas of the character string image defined by the upper and lower reference lines, and determines the upper and lower reference lines such as to maximize the ratio of the difference between the average length of horizontal white runs in the area over the upper reference line and the average length of horizontal white runs in the area intervening between the upper and lower reference line and the difference between the average length of horizontal white runs in the area under the lower reference line and the average length of horizontal white runs in the area intervening between the upper and lower reference lines to the total variances in the individual areas.

27. The character recognition system according to claim 26, wherein when the reference line detecting unit detects the reference lines from the character string image, it determines the upper and lower reference lines so as to maximize an evaluation function, which has, as its numerator, the summation of the difference between the average length of horizontal white runs in the area over the upper reference line and the average length of horizontal white runs in the area intervening between the upper and lower reference lines and the difference between the average length of horizontal white runs in the area under the lower reference line and the average length of horizontal white runs in the area intervening between the upper and lower reference lines, and, as its denominator, the summation of the length variance of horizontal white runs in the area over the upper reference line and twice of the length variance of horizontal white runs in the areas intervening between the upper and lower reference lines and the length variance of horizontal white runs in the area under the lower reference line.

28. The character recognition system according to claim 22, wherein when the reference line detecting unit estimates positions, skews and curvatures of the upper and lower reference lines, it estimates positions of the upper and lower reference lines, and estimates skews of the upper and lower reference lines on the basis of the estimated positions, and estimates curvature radii of the upper and lower reference lines on the basis of the estimated skews.

29. The character recognition system according to claim 21, wherein when the reference line detecting unit detects the reference lines from the character string image, it executes compression and expansion on each vertical pixel column in the image and on each segment divided by the upper and lower reference lines, and shaping such that the upper and lower reference lines are in horizontally parallel and the interval between upper and lower reference lines is constant.

30. A character recognition method comprising:
- storing an inputted character string image;
- shaping, in a preprocessing step, the stored character string image by correcting deformations of the character string image in at least one of size or skew;
- detecting two upper and lower reference lines characterizing the positions of the characters in a character string in the character string image received;
- shaping the character string image so as to correct the upper and lower reference lines on the basis of the reference line detected and the character string image, and outputting the shaped character string image back to the preprocessing step, and
- reading a character string from the character string image having been shaped so as to correct the upper and lower references and received from the preprocessing step,
wherein detecting reference lines further includes:
  - estimating the position of the reference line;
  - skewing the reference lines from the horizontal direction, and estimating a radii of curvature of the reference lines.

31. The character recognition method according to claim 30, wherein in estimating the reference line position, a reference line from the character string image is detected, it obtains the reference lines as quadratic curves, which are determined by the positions, the skews and the radii of curvature of the reference lines obtained by the reference line position, skew and curvature radius estimating step, respectively.

32. The character recognition method according to claim 30, wherein when the reference line detects the reference lines from the character string image, it uses lengths and coordinates of horizontal white runs constituting the background of the character string image.

33. The character recognition method according to claim 32, wherein when the reference line detects the reference lines from the character string image, it calculates the average lengths of horizontal white runs in individual areas of the character string image defined by the upper and lower reference lines, and determines the upper and lower reference lines such as to maximize the difference between the average length of horizontal white runs in the area over the upper reference line and the average length of horizontal white runs in the area intervening between the upper and lower reference lines and also the difference between the average length of horizontal white runs in the area under the lower reference line and the average length of horizontal white runs in the area intervening between the upper and lower reference lines.

34. The character recognition method according to claim 33, wherein when the reference line detects the reference lines from the character string image, it determines the upper and lower reference lines such as to maximize the summation of the difference between the average length of horizontal white runs in the area over the upper reference line and the average length of horizontal white runs in the area intervening between the upper and lower reference lines and the difference between the average length of horizontal white runs in the area under the lower reference line and the average length of horizontal white runs in the area intervening between the upper and lower reference lines.

35. The character recognition method according to claim 32, wherein when the reference line detects the reference lines from the character string image, it calculates the averages and variances of the lengths of horizontal white runs in the areas of the character string image defined by the upper and lower reference lines, and determines the upper and lower reference lines such as to maximize the ratio of the difference between the average length of horizontal white runs in the area over the upper reference line and the average length of horizontal white runs in the area intervening between the upper and lower reference line and the difference between the average length of horizontal white runs in the area under the lower reference line and the average length of horizontal white runs in the area intervening between the upper and lower reference lines to the total variances in the individual areas.

36. The character recognition method according to claim 31, wherein when the reference line detects the reference lines from the character string image, it determines the upper and lower reference lines so as to maximize an evaluation function, which has, as its numerator, the summation of the difference between the average length of horizontal white runs in the area over the upper reference line and the average length of horizontal white runs in the area intervening between the upper and lower reference lines and the difference between the average length of horizontal white runs in the area under the lower reference line and the average length of horizontal white runs in the area intervening between the upper and lower reference lines and, as its denominator, the summation of the length variance of horizontal white runs in the area over the upper reference line and twice of the length variance of horizontal white runs in the areas intervening between the upper and lower reference lines and the length variance of horizontal white runs in the area under the lower reference line.

37. The character recognition system according to claim 31, wherein when the reference line estimates positions, skews and curvatures of the upper and lower reference lines, it estimates positions of the upper and lower reference lines, and estimates skews of the upper and lower reference lines on the basis of the estimated positions, and estimates curvature radii of the upper and lower reference lines on the basis of the estimated skews.

38. The character recognition system according to claim 30, wherein when the reference line detects the reference lines from the character string image, it executes compression and expansion on each vertical pixel column in the image and on each segment divided by the upper and lower reference lines, and shaping such that the upper and lower reference lines are in horizontally parallel and the interval between upper and lower reference lines is constant.

* * * * *